March 8, 1938.  L. A. MEISSE  2,110,607
INSULATED CONDUCTOR SUPPORT
Filed Sept. 2, 1936
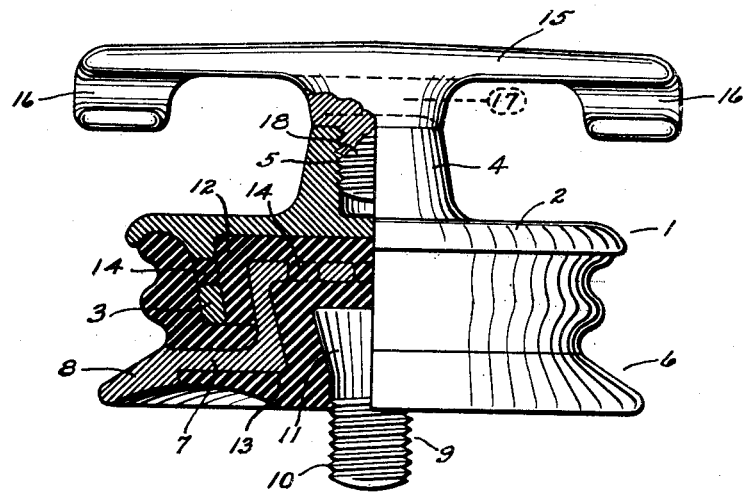
Inventor
Louis A. Meisse
By
Attorney Patented Mar. 8, 1938

2,110,607

UNITED STATES PATENT OFFICE 2,110,607

INSULATED CONDUCTOR SUPPORT

Louis A. Meisse, Mansfield, Ohio, assignor to The Ohio Brass Company, Mansfield, Ohio, a corporation of New Jersey Application September 2, 1936, Serial No. 99,170

1 Claim. (Cl. 173—366)

My invention relates to hangers of the insulated type for supporting conductors in connection with overhead trolley construction.

The object of my invention is to provide a hanger which will possess a higher insulating value between the conductor and the ground and also to eliminate or greatly reduce the possibility of grounding the trolley wire in case of dewirement of the current collector.

Other objects of my invention will be apparent from the disclosure of my invention which follows.

My invention resides in the new and novel construction, combination and relation of the parts hereinafter described and shown in the accompanying drawing.

In the drawing:

The figure shows an elevational view in partial section of my invention.

In the preferred embodiment of my invention I use a body member 1 which has a plate portion 2 and a depending inwardly projecting flange 3 and a projecting boss 4 which may be threaded as at 5.

I also use an intermediate member 6 in the form of an inverted cup with reduced opening and a flange 7 projecting outwardly from the edge of the opening. The flange 7 is provided with a further projecting portion 8 which is of greater diameter than the member 1 for the purpose of preventing a flying trolley pole from simultaneously contacting with the trolley wire and the member 1 which may be grounded.

I also use the stud 9, the lower end 10 of which is threaded for attachment to a trolley wire support which may be of any desirable construction. The stud 9 is also provided with a conically shaped head 11, the side face of which is parallel with the inner side face of the intermediate member 6.

The outer side face of the member 6 is also parallel to the inner side face of the flange 3.

Interposed between the members 1 and 6 and between the members 6 and 9 is a composition insulating material 12 and 13 respectively. The plate portion 2 protects the insulation from above.

This insulation is positioned through the medium of proper dies and pressure and also the use of heat if required. In order to bind the parts more securely together, I form spaced openings 14 in the members 1 and 6 which are also filled with composition which in turn forms an integral part of the composition layers 12 and 13.

The dove-tailed construction of the various parts adds materially to the strength of the device and establishes a factor of safety with respect to the load it is to support which is considerably in excess of other hangers for the same purpose.

Through the use of the member 6 the insulation is broken up into substantially the equivalent of the insulation for a double hanger, or in other words without materially increasing the size of the hanger over that of the ordinary type I am able to provide double insulation of the highest efficiency and reliability. The insulations 12 and 13 might be combined into a single unit of insulation without the intervening member 6, but where the insulation is made quite heavy it has been found in practice that there is greater liability for such increased thickness not to perform as efficiently both electrically and mechanically as where it is broken up into units. This lack of reliability is due to the difficulty of properly heating the heavy mass of material and of the application of sufficient and uniform distribution of pressure upon the insulation to cause its proper flow with respect to the castings.

As pointed out, one of the features of my hanger is the projecting flange 8, and the intermediate inverted cup and flange 7 provide a very convenient and novel manner of supporting the flange 8 relative to the hanger in a strong and efficient manner, and at the same time the inverted cup and flange 7 act to break up the insulation into units, thus serving a double function.

By paralleling the adjacent side surfaces of the members 1, 6 and 9, I am able to secure a very high mechanical resistance to the separation of the parts under load and a relatively low stress per unit of area.

In order to support the hanger from an overhead span wire, I may employ the fitting 15 which has projecting arms with U-shaped grooves 16 at each end opening in one direction and a groove 17 adjacent the center of the fitting opening in the opposite direction, and in these grooves the span wire is positioned, as is well known to those familiar with the art.

The fitting 15 is secured to the hanger boss 4 by means of the threaded stud 18 which is shown as an integral part of the fitting 15. By back-rotating the fitting 15 possibly one-half or one-quarter turn after it has been contacted with the end face of the boss 4, the hanger will then pivot about its vertical axis with respect to the fitting 15 and form what might be termed a pivotal union between the hanger and fitting 15.

If it is desired to use the hanger proper in mine overhead construction, the fitting 15 would probably be eliminated and the hanger boss 4 attached directly to an overhead expansion bolt as is customary.

In connection with hangers of the present-day construction, especially of the round top type in which an outer metal shell forms an inverted cup and is filled with insulation from which a stud projects downwardly, if such hanger is attached to a grounded span wire then the lower edge of the inverted cup is also grounded and a flying trolley pole is very likely to simultaneously engage with the trolley wire and inverted cup thus producing a short circuit which is likely to cause considerable damage and especially is this true if the hanger is used in connection with trolley bus overhead construction in which positive and negative conductors are supported from the same span wire within possibly 18" to 24" apart.

With my construction, as previously stated, the trolley pole may simultaneously contact with the trolley wire and the flange 8 of the intermediate shell 6 without causing any short circuit as the shell 6 would still be insulated from the span wire which might be grounded.

While auxiliary insulation may be used in connection with the overhead span wire, still if it is not used, my hanger provides double insulation to ground and protection against grounding through a flying trolley pole all without unduly increasing the size of the hanger over that of the standard single insulation types now on the market.

Modifications will suggest themselves to those skilled in the art based upon my disclosure and, therefore, I wish to be limited only by my claim.

I claim:—

An insulated hanger comprising a body member of metal having a side wall forming an inverted hollow frustum of a cone with the small end open and the large end closed by a plate-like part projecting beyond the side wall and forming a flange about the large end of the wall, the body member provided with means whereby attachment may be made thereto in order to support the hanger, a second body member of metal having a side wall forming an inverted hollow frustum of a cone with the small end open and the large end closed by a plate-like part and a flange surrounding the open end of the conical part and projecting outwardly beyond the conical part of the said first body member to protect the hanger against flying trolley poles, the conical part of the second body member being positioned in the conical part of the first body member, the side walls of the members sloping uniformly and the said second body member spaced from the said first body member, a stud having a conical shaped head positioned within the conical part of the said second body member and having a stem projecting from the hanger with means to secure thereto a trolley wire support, openings through the conical part of the said first body member and other openings through the plate-like closing part of the second body member and an insulating material moulded in position between the body members and stud and extending through the said openings to hold the parts in insulated position relative to each other and against separation, the insulation extending between the said flanges being exposed but protected from flying trolley poles by the said flange on the said second body member, the insulation also covering a portion of the lower face of the last mentioned flange.

LOUIS A. MEISSE.